United States Patent [19]
Breant

[11] Patent Number: 6,025,423
[45] Date of Patent: *Feb. 15, 2000

[54] FLAME-RETARDANT THERMOPLASTIC COMPOSITIONS FOR ELECTRICAL CABLE COATINGS

[75] Inventor: Patrice Breant, Serquigny, France

[73] Assignee: Elf Atochem S.A., Paris, France

[ * ] Notice: This patent issued on a continued prosecution application filed under 37 CFR 1.53(d), and is subject to the twenty year patent term provisions of 35 U.S.C. 154(a)(2).

[21] Appl. No.: 09/001,320

[22] Filed: Dec. 31, 1997

Related U.S. Application Data

[62] Division of application No. 08/534,434, Sep. 27, 1995, abandoned.

[30] Foreign Application Priority Data

Sep. 28, 1994 [FR] France ................................. 94 11584

[51] Int. Cl.[7] .................. B32B 1/08; C08K 3/10; C08K 3/12

[52] U.S. Cl. .......................................... 524/412; 428/36.91
[58] Field of Search .......................... 524/514; 428/36.91

[56] References Cited

FOREIGN PATENT DOCUMENTS 532122   3/1993   European Pat. Off. .
564338  10/1993   European Pat. Off. .

*Primary Examiner*—Kriellion Sanders
*Attorney, Agent, or Firm*—Pennie & Edmonds LLP

[57] ABSTRACT

The present invention relates to flexible thermoplastic compositions having a polyamide matrix, a dispersed polyethylene phase, and flame-retardant agents distributed between the two phases. These compositions have good mechanical properties, improved fire resistance and resistance to solvents and optionally excellent dimensional stability when hot. They can be used as coverings for electrical cables, as pipes, or in the creation of objects obtained by molding, forming, or film-forming.

11 Claims, No Drawings

FLAME-RETARDANT THERMOPLASTIC COMPOSITIONS FOR ELECTRICAL CABLE COATINGS

This is a divisional of Ser. No. 08/534,434 filed Sep. 27, 1995, now abandoned.

FIELD OF THE INVENTION

The present invention relates to polyamide based flame-retardant thermoplastic compositions and to their application to the covering of electrical cables. More particularly, these compositions are based on a polyamide matrix, on a dispersed polyethylene phase, and on flame-retardant agents distributed between the two phases.

The present invention thus relates to flexible thermoplastic compositions having good mechanical properties, improved fire resistance and resistance to solvents and optionally excellent dimensional stability when hot. They can be used as coverings for electrical cables, as pipes, or in the creation of objects obtained by molding, forming, or film-forming.

BACKGROUND OF THE INVENTION

Flame-retardant compositions based on ethylene polymers and inorganic fillers are known and used as coverings for electrical cables. In particular, Patents EP 326,775 and EP 406,035 describe compositions containing inorganic fillers, such as magnesium hydroxide or aluminum hydroxide, and crosslinked ethylene polymers. These compositions do not contain polyamide. For some electrical cables, it is necessary for the mechanical properties and the resistance to solvents to be better than those of polyethylene-based compositions.

Patent EP 564,338 describes a multi-phase thermoplastic composition based on polyamide resin containing an ethylene polymer with epoxide functional groups. The sole objective of this patent is to improve the low-temperature impact strength. The composition can contain fillers in order to give it rigidity. No mention is made of the distribution of the flame retardant agent which prevents the properties of the polyamide matrix from being detrimentally affected.

Application JP 05093108 A, published on Apr. 16, 1993, describes flame-retardant compositions for electrical cables based (i) on polyethylene or ethylene copolymers, (ii) on polyamide in order to resist wear, (iii) on functionalized copolymers in order to make the polyethylene and the polyamide compatible and finally on flame-retardant agents. These compositions, based essentially on polyethylene, have neither the mechanical properties of the present invention nor their resistance to oil.

European Application EP 258,040 describes alloys (i) of polyamide and (ii) of an ethylene-alkyl acrylate-maleic anhydride copolymer which are optionally ionomerized and which contain an agent capable of crosslinking (i) or (ii). Moreover, no mention is made nor are any examples given of the incorporation of flame-retardant agents.

EP 532,122 describes compositions comprising polyamide, functionalized polypropylene and magnesium hydroxide having a good surface appearance after molding. These compositions have a very high magnesium hydroxide content and the flexural modulus varies from 5,800 to 8,400 MPa, which characterizes a material which is too rigid to be able, for example, to insulate electrical cables. Moreover, this composition has poor resistance to oils and to acids.

SUMMARY OF THE INVENTION

The present invention provides a thermoplastic composition comprising (A) a polyamide matrix, (B) a dispersed phase comprising a polyolefin that is at least partially crosslinked, and (C) a flame-retardant agent distributed in the two phases (A) and (B). In the compositions of the present invention, both the variation in the tensile strength of the composition and the variation in the elongation at break of the composition after a time of 24 hours in ASTM No. 2 oil at 100° C. are less than 25%.

The compositions of the present invention may be produced by a process which comprises the steps: a) providing an extruder having at least a first and a subsequent region, b) mixing an ethylene polymer having at least one functional group selected from the group consisting of carboxyl groups and derivatives thereof and an ethylene polymer having at lest one epoxide functional group, c) adding to the mixture produced in step b) the polyamide and at least a part of the flame-retardant agents, d) introducing the mixture produced in step c) into the first region of the extruder, and e) introducing the remainder of the flame-retardant agents into a subsequent region of the extruder.

The present invention also provides articles of manufacture such as electrical cables having a covering comprising at least one layer of which is composed of a composition as described above.

These and other aspects of the present invention are discussed in detail hereinbelow.

DESCRIPTION OF THE PREFERRED EMBODIMENTS

The present invention comprises thermoplastic compositions comprising a polyamide matrix (A), a dispersed phase (B) based on at least partially crosslinked polyolefin, and flame-retardant agents (C) distributed in the two phases and such that the variation in the tensile strength and the variation in the elongation at break after a time of 24 hours in ASTM No. 2 oil at 100° C. are less than 25%.

A process for preparing the compositions of the invention comprises introducing the polyamide (A), the components of the phase (B), which have been premixed beforehand, and at least a part of the flame retardant agents (C) into an extruder, the remainder of (C) being introduced in a subsequent region of the extruder.

It is important that the flame-retardant agents are introduced during the preparation of the material in order to be able to be distributed in the matrix and the nodules of the dispersed phase without detrimentally affecting the mechanical properties thereof.

Component (A)

The polyamide matrix (A) of the present invention is composed of a polyamide or of a polyamide composition. Polyamide here denotes a resin produced by polycondensation of one or of a number of amino acids, such as aminocaproic, 7-aminoheptanoic and 11-aminoundecanoic acids or of equimolar amounts of a saturated dicarboxylic acid containing from 4 to 12 carbon atoms with a diamine, the diamine containing from 4 to 12 carbon atoms. It is possible to use an excess of diamine, so as to obtain an excess of end amine groups with respect to the end carboxyl groups in the polyamide.

Mention will be made, as illustration of such resins, of:
poly(hexamethylene adipamide) (polyamide-6,6),
poly(hexamethylene azelamide) (polyamide-6,9),
poly(hexamethylene sebacamide) (polyamide-6,10),
poly(hexamethylene dodecanediamide) (polyamide-6,12), poly(undecanoamide) (polyamide-11).

It is also possible, in the present invention, to use polyamides prepared by polycondensation of at least two of the monomers and polymers mentioned above, which results in copolyamides.

The polyamide resins of the present invention can also be produced by polymerization of one or a number of lactams, such as caprolactam, which results in polyamide 6, or lauryllactam, which results in polyamide 12.

These polyamide resins have a molecular mass of at least 5,000 and preferably a melting point greater than or equal to 180° C.

Polyamides also denote the polyamide-based thermoplastic elastomers which are block copolymers, also known as polyetheramides or polyetheresteramides, the rigid sequences of which are composed of polyamides and the flexible sequences of which are polyethers.

For example, polyamide-6 or -12 blocks with carboxylic acid ends and with a mass Mn of between 600 and 6,000 can be condensed with polyether blocks with OK ends and with a mass of 500 to 3,000 of the polyethylene glycol (PEG) or polytetramethylene glycol (PTMG) type. Polyetheresteramides are obtained.

If the above polyethers are converted in order to have amine ends, condensation of these polyetherdiamines with the dicarboxylic polyamides produces polyetheramides; that is to say that the polyamide matrix can also be composed of a mixture of at least two products chosen from polyamides, polyetheramides and polyetheresteramides.

The polyamides can contain various formulation additives such as antioxidants, UV stabilizers or plasticizers, such as N-butylbenzenesulphonamide.

Component (B)

According to the present invention, the dispersed phase (B) can be the result of the viscosity modification introduced into polyolefins by the in situ reaction of radical initiators, such as peroxides.

The polyolefins can be homo- or copolymers of alpha-olefins. Use is advantageously made of polyethylenes or of ethylene copolymers.

The dispersed phase (B) can also be the result of the chemical reaction of an ethylene molecule or polymer (B1) carrying one or a number of functional groups deriving from acids, which can, for example, be mono- or dicarboxylic acids, or from polyamines and of an ethylene molecule or polymer (B2) carrying one or a number of epoxide-type functional groups. This reaction can be activated by the use of an appropriate additive (B3) containing nitrogen or a tertiary amine functional group.

The polymers B1 can derive from copolymers of ethylene and of a saturated carboxylic acid vinyl ester or from copolymers of ethylene and of an unsaturated carboxylic acid ester.

The functional groups deriving from carboxylic acids or from polyamines can be introduced by copolymerization or grafting in the molten state or in solution, according to the rules of the art. The functional groups deriving from carboxylic acids are, for example, the acids themselves, esters, salts or anhydrides. Use is made, for example, of itaconic anhydride or of maleic anhydride.

The polymers B1 are advantageously ethylene-vinyl acetate (EVA) or ethylene-alkyl (meth)acrylate copolymers copolymerized or grafted with maleic anhydride.

The polymers B2 can derive from copolymers of ethylene and of a saturated carboxylic acid vinyl ester or from copolymers of ethylene and of an unsaturated carboxylic acid ester.

The epoxide-type functional groups can be introduced by copolymerization or grafting in the molten state or in solution, according to the rules. of the art.

The epoxide functional groups which take part in the composition of the ethylene polymer (B2) can be aliphatic glycidyl esters or ethers. By way of illustration, mention may be made of glycidyl (meth)acrylates, glycidyl maleate, glycidyl itaconate, vinyl glycidyl ether, allyl glycidyl ether or vinyl-cyclohexene epoxide.

The polymers B2 can, for example, be ethylene-vinyl acetate (EVA) or ethylene-alkyl (meth)acrylate copolymers copolymerized or grafted with glycidyl methacrylate.

Mention may be made, as illustration of dispersed polyethylene phase (B), of the product of the reaction of polyacid or polyanhydride or polyamine derivatives with the ethylene-alkyl (meth)acrylate-glycidyl (meth)acrylate terpolymer and the product of the reaction of an ethylene-alkyl (meth)acrylate-maleic anhydride terpolymer with an ethylene-alkyl (meth)acrylate-glycidyl (meth)acrylate terpolymer catalyzed by, in particular, dimethyltallowamine or tetramethylguanidine (B3).

According to a third possibility, the dispersed phase (B) can also be the result of the same reaction of (B1) with (B1) or (B2) with (B2) in the presence of a crosslinking agent.

Crosslinking

The at least partial crosslinking or the increase in viscosity of the polymers which have to constitute the dispersed phase is necessary. Without this crosslinking or increase in viscosity, or if it is insufficient, the dispersed phase is capable, during the operation of blending and of manufacturing the compositions of the invention, of being composed of polyamide, which is harmful to the good resistance to the solvent and to the ease of use of the compositions of the invention.

The ratio R1 of the content of the polyamide (A) to that of the dispersed phase (B), defined by (A)/(B) by weight, can be between 0.25 and 3 and preferably between 0.67 and 1.5. The values, as defined, of the ratio R1 make it possible to obtain a flexible material.

The ratio R2 of the content of the reactant (B1) to that of the reactant (B2), defined by (B1)/(B2), is chosen according to the amounts of reactive functional groups present in (B1) and (B2) and preferably by their stoichiometry.

The ratio R3 of the content of the activator (B3) to the sum of the contents of the reactive polymers, defined as (B3)/((B1)+(B2)) is between 0 and 0.5 by mass and preferably between 0 and 0.1 by mass.

Component (C)

The flame-retardant agents (C) are generally inorganic fillers suitable for the use of the material. Mention will be made, for example, of magnesium hydroxide, aluminum hydroxide, the various hydrotalcites or calcium carbonate. The effectiveness of these additives can be reinforced by blending them.

The effectiveness of these flame-retardant fillers can also be improved by the joint incorporation of products such as antimony trioxide or zinc hydroxystannate, zinc stannate or zinc borate, employed at suitable contents. For this type of additives, suitable fire resistance is generally obtained for an overall content by mass greater than 30%.

The additives introducing the improved fire resistance can also be systems known as intumescent systems which contain polyols, such as, for example, pentaerythritol, and products carrying nitrogen containing or phosphorus-containing functional groups, such as, for example, ammonium polyphosphate or melamine cyanurate. The effectiveness of these systems can also be improved by the joint use of additives such as antimony oxide or various zeolites. For this type of additives, a suitable fire resistance is generally obtained for an overall content by mass greater than 25%.

The fire resistance can also, when the circumstances of use of the final material make it possible, be improved by the use of halogenated derivatives, such as decabromodiphenyl ether or decabromodiphenyl, generally in combination with products such as antimony oxide. For this type of additives, a suitable fire resistance is generally obtained for an overall content by mass greater than 10%.

The products (C) are distributed throughout the composition. Pigments, dyes, stabilizers, antioxidants, and/or plasticizers can also be incorporated in the compositions of the invention.

Properties

The fire resistance of a composition may be assessed by measuring the oxygen index (LOI), as defined in ASTM standard D2863-70, on the test pieces used for the bending test (rods 80×10×4 mm$^3$). A product has a good fire resistance if its LOI is greater than 28–30.

The mechanical properties are assessed by measuring the dynamometric properties such as the elongation at break (EB) and the tensile strength (TS), according to ISO standard R 527/1A, on test pieces having the shape of dumbbells with dimensions 105×10×4 mm$^3$, recommended by the ISO standard which has been referred to, subjected to a draw rate of 50 mm/min.

The behavior in ASTM No. 2 oil signifies good resistance to solvents.

The compositions of the invention have good resistance to hydrochloric acid and sodium hydroxide.

The advantage of the compositions of the invention, in addition to the mechanical properties and the resistance to solvents, is that they are thermoplastic, which facilitates their use, whereas some compositions of the art must be crosslinked during their application to the electrical cable using peroxides which are dangerous to handle and which can give rise to products which are smelly or harmful to the qualities of the covering. The compositions of the present invention are prepared and then subsequently used as simple thermoplastic compositions, for example for covering electrical cables.

The behavior of these products is assessed by the variation in the dynamometric properties (EB and TS) after 4 hours at 70° C. in 1N solutions. A material having good resistance to solvents typically exhibits variations in properties of less than 25%.

The compositions of the invention can have different flexibilities. The flexibility of the material (or its pliability) is assessed by measuring the flexural modulus of test pieces having the shape of rods of dimensions 80×10×4 mm$^3$ recommended by the ISO standard 178. Polyamide-rich compositions have little flexibility. The flexibility can be adjusted by the quantity and the nature of the phase (B). The compositions of the invention can have a flexural modulus below 1,000 MPa or even 500 MPa while retaining good resistance to solvents and good fire resistance. Advantageously, the compositions have a flexural modulus between 100 and 500 MPa and preferably between 150 and 450.

The compositions of the invention exhibit good dimensional stability when hot (creep). The dimensional stability when hot is assessed by the elongation under load when hot of a test piece of ISO R 527 type. The typical test temperature is 200° C. and the test piece is subjected to an initial stress of 2 bars for 15 min. The variation in elongation measured with respect to the initial length of the test piece defines a quantity also known as the creep resistance. A material having good dimensional stability when hot, such as a crosslinked polyethylene, typically exhibits a creep resistance at 200° C., after 15 min, of less than 100%. The creep resistance increases with the melting point of the polyamide. The compositions of the invention have a markedly lower creep, of the order of 10% at most and more often less than 5%.

Preparation

The present invention also relates to a process for the preparation of these compositions. The constituents of the dispersed phase B are mixed beforehand under conditions such that there is no significant initiation of reaction, for example by dry mixing in a drum.

The compositions can be obtained by direct mixing, in a conventional extruder, of the various components of the polymers in the molten state, under conditions of temperature and of residence time which are suited to the kinetics of the reactions involved.

The mixture of the components of B and the polyamide are generally introduced in region 1 of the extruder used for the manufacture of the material with all or a portion of the flame-retardant additives; in the latter case, the remainder of the flame-retardant additives is introduced by cram-feeding in another region of the extruder.

The extruders generally used can be single-screw or co- or counter-rotating twin-screw. In the following examples, the mixtures were prepared either on a Buss PR46/70 Ko-Kneader with L/D=15 or on a Werner 40 (co-rotating twin-screw) under the following temperature conditions:

|  | Buss Ko-Kneader | | | | |
| --- | --- | --- | --- | --- | --- |
| Regions | 1 | 2 | 3 | 4 | 5 |
| Temperatures (° C.) | | 210 to 230 | 240 to 270 | 220 to 240 | 210 to 230 |

|  | Werner 40 | | | | | | | |
| --- | --- | --- | --- | --- | --- | --- | --- | --- |
| Regions | 1 | 2 | 3 | 4 | 5 | 6 | 7 | 8 |
| Temperatures (° C.) | 280 | 280 | 260 | 270 | 255 | 220 | 230 | 270 |

The screw speeds and thus the extrusion flow rate of the compositions are variable, according to the mixtures and the extruder used. For example, in the case of the Werner 40, the screw speed is typically 150 revolutions/minute for the flow rate of 50 kg/hour and, in the case of the Buss Ko-Kneader, the screw speed is typically 280 revolutions/minute in the kneader and 35 revolutions/minute in the extruder for a flow rate of 20 kg/hour.

Utility

Another subject of the invention relates to electrical cables having a covering comprising at least one layer composed of the compositions of the invention.

Another subject of the present invention relates to articles obtained from at least one composition described above.

These articles can be obtained by any conventional method used in the thermoplastics industry, in particular molding, forming and film-forming.

EXAMPLES

In the examples, evaluation of the properties and characteristics of the compositions described according to the present invention is carried out after shaping as dumb-bells or rods via conventional injection extruders under the following conditions:

| KM B1 or B2 Press: | | | | | | | | | |
|---|---|---|---|---|---|---|---|---|---|
| Injection temp. | Mould temp. | Injection pressure | Hold pressure | Feeding (mm) | Injection rate | Hold time | Back pressure | Swing (mm) | Screw speed |
| 270° C. | 40° C. | 150 bars | 40 bars | 28 | 40% | 20 s | 30 bars | 11 | 163 rev/min |

The properties of the compositions of the invention, such as:

Elongation at break,

Tensile strength,

Flexural modulus,

Creep,

Fire resistance,

Resistance to the solvents NaOH and HCl, were measured according to the standards mentioned above in the description.

The electrical properties were determined, for the measurement of the dielectric constant and the dissipation factor, according to ASTM standard D 149, for the measurement of the dielectric strength, according to ASTM standard D 150 and, for the measurement of the surface and transversal resistivity, according to ASTM standard D 257, on plaques with a thickness of 2 mm.

The samples are conditioned for 15 days at 23° C. at 50% relative humidity before any measurement.

The aim of the following examples is to illustrate the invention without implied limitation. The combined examples are described in the following Tables 1 to 7.

The nomenclature used is the following:

EB (%)=elongation at break, expressed as %.

TS (MPa)=tensile strength, expressed as MPa.

FM (MPa)=flexural modulus, expressed as MPa.

LOI oxygen index, expressed as %.

Creep=creep resistance, expressed as %.

Solvent resistance:

D.EB (%)=variation in elongation at break after a time of 24 h at 100° C. in ASTM No. 2 oil, expressed as %.

D.TS variation in tensile strength after a time of 24 h at 100° C. in ASTM No. 2 oil, expressed as %.

D.EBa (%), D.TSa (%), D.EBb (%) and D.TSb (%) respectively represent the variations in elongation at break and the variations in tensile strength after a residence time of 4 hours at 70° C. in (a) hydrochloric acid (1N) and (b) sodium hydroxide (1N), expressed as %.

Electrical properties:

Tan δ=electrical dissipation factor.

∈=dielectric constant.

SR=surface resistivity, expressed as ohm.

TR transversal resistivity, expressed as ohm·cm.

DS=dielectric strength, expressed as kV/mm.

The presence of the flame-retardant agents was observed in the matrix and in the dispersed phase.

The products and the polymers described in the tables are the following:

PA-6=Orgamide RMNO CD (Elf Atochem SA): polyamide-6. Melting point=218° C. Vicat point=208° C. (1 kg load).

Plasticized PA-6=Orgamide RMNO P40 CD (Elf Atochem SA): plasticized polyamide-6. Vicat point= 190° C. (1 kg load).

PA-11=Rilsan BMNO D (Elf Atochem SA): polyamide-11. Density=1.03 g/cm. Melting point=185° C. Vicat point=180° C. (1 kg).

Plasticized PA-11=Rilsan BMNO P40 CD (Elf Atochem SA): plasticized polyamide-11. Density 1.05 g/cm3. Melting point=180° C. Vicat point=170° C. (1 kg load).

PA-12=Rilsan AMNO D (Elf Atochem SA): polyamide-12. Density=1.01 g/cm3. Melting point 175° C. Vicat point=172° C. (1 kg load).

Plasticized PA-12=Rilsan AMNO P40 CD (Elf Atochem SA): plasticized polyamide-12. Density 1.04 g/cm$^3$. Melting point=171° C. Vicat point 160° C. (1 kg load).

Pebax=Pebax 7033 SA 00 (Elf Atochem SA): polyetheresteramide. Shore D hardness=70. Density 1.01 g/cm$^3$. Vicat point=165° C. Melting point=172° C., comprising PA-12 and PTMG blocks.

PB 6333=Pebax 6333 SA 00 (Elf Atochem SA): polyetheresteramide. Shore D hardness=63. Density 3 1.01 g/cm$^3$. Vicat point=161° C. Melting point=169° C., comprising PA-12 blocks and PTMG blocks.

PB 2533=Pebax 2533 SA 00 (Elf Atochem SA): polyetheramide. Shore D hardness=25. Density 1.01 g/cm$^3$. Vicat point=60° C. Melting point=134° C., comprising PA-12 and PTMG blocks.

Lot 3700=Lotader 3700 (Elf Atochem): ethylene-butyl acrylate-maleic anhydride terpolymer, (acrylate content=30% and maleic content=2 with a melt index of 5 dg/min (2.16 kg/190° C.).

AX 8660=Lotader AX 8660 (Elf Atochem): ethylene-butyl acrylate-glycidyl methacrylate terpolymer (acrylate content=28% and epoxide content=8%), with a melt index=5 dg/min (2.16 kg/190° C.).

XX 1275=master-batch containing DMT (Elf Atochem SA).

DMT=Noram DMS D (Ceca): dimethyltallowamine.

Tere acid=terephthalic acid.

Aral.DY0393=epoxy resin (Ciba-Geigy). Epoxy value=4.9–5.4 Aeq/Kg, with viscosity 4 MPa's at 25° C.

TMG=tetramethylguanidine.

Stearyl al.=stearyl alcohol.

PTSA=paratoluenesulphonic acid.

Antiox 1=Irganox 1098 (Ciba-Geigy).

Antiox 2=Hostanox VP PAR 24 (Hoechst).

Mg(OH)2=magnesium hydroxide, Magnifin H10 (Martinswerk).

$Sb_2O_3$=antimony trioxide (Timomox 100) (Mines de la Lucette).

Adine 102=Decabromodiphenyl (Ethyl Corporation).

Zn stannate=Zinc stannate (Joseph Storey Company).

Mel. Cyan.=Melamine cyanurate (Chemie Linz).

Per=Pentaerythritol (Celanese).

Ceepree=inorganic glass, C200 grade (ICI).

The properties of different compositions varying in the nature of the base polyamide used are represented in Table 1.

The properties of different compositions based on polyamide-6 varying in the relative proportions of the crosslinking polymers are represented in Table 2.

The properties of different compositions based on polyamide-6 varying in the content of flame retardant fillers $Mg(OH)_2$ and $Sb_2O_3$ are represented in Table 3.

The properties of different compositions based on polyamide-6 varying in the nature of the flame-retardant fillers employed are represented in Table 4.

The properties of different compositions based on polyamide-6 varying in the nature of the crosslinking reactants are represented in Table 5.

The electrical properties of different compositions based on polyamide-6 and on plasticized polyamide-6 are represented in Table 6.

The resistance to hydrochloric acid, to sodium hydroxide and to ASTM No. 2 oil of different compositions based on polyamide-6, on polyetheresteramide and on different ratios of crosslinking polymers is represented in Table 7.

The results unequivocally show that these formulations provide a material which is flexible, which has improved fire resistance, which has good resistance to solvents, and which has good dimensional stability when hot.

TABLE 1

Compositions based on different polyamides

| Example | 1 | 2 | 3 | 4 | 5 | 6 | 7 | 8 |
|---|---|---|---|---|---|---|---|---|
| PA-6 | 32.15 | 32.15 | | | | | | |
| Plasticized PZ-6 | | | 29.65 | | | | | |
| PA-11 | | | | 32.15 | | | | |
| Plasticized PA-11 | | | | | 32.15 | | | |
| PA-12 | | | | | | 32.15 | | |
| Plasticized PA-12 | | | | | | | 32.15 | |
| Pebax | | | | | | | | 32.15 |
| Lot 3700 | 23.15 | 23.15 | 23.15 | 23.15 | 23.15 | 23.15 | 23.15 | 23.15 |
| AX 8660 | 8 | 8 | 7.4 | 8 | 8 | 8 | 8 | 8 |
| XX 1275 | 1 | 1 | 0.85 | 1 | 1 | 1 | 1 | 1 |
| $Mg(OH)_2$ | 30 | 35 | 35 | 35 | 35 | 35 | 35 | 35 |
| $Sb_2O_3$ | 5 | | 5 | | | | | |
| Antiox 1 | 0.5 | 0.5 | 0.5 | 0.5 | 0.5 | 0.5 | 0.5 | 0.5 |
| Antiox 2 | 0.2 | 0.2 | 0.2 | 0.2 | 0.2 | 0.2 | 0.2 | 0.2 |
| PROPERTIES | | | | | | | | |
| EB (%) | 122 | 135 | 130 | 124 | 118 | 98 | 123 | 102 |
| TS (MPa) | 21.6 | 23.2 | 21.5 | 21.6 | 18.4 | 20.1 | 18.3 | 17.8 |
| FM (MPa) | 246 | 315 | 290 | 339 | 139 | 265 | 136 | 165 |
| LOI (%) | 28.6 | 28.4 | | | | | | |
| Creep (%) | 0.4 | | | | | | | |
| Resistance to oil: D.EB (%) | −15 | −10 | | 2 | −11 | −10 | −22 | −25 |
| D.TX (%) | −1 | −15 | | −2 | −8 | −13 | −16 | −18 |

TABLE 2

Composition based on PA-6 and on different crosslinking polymer compositions

| Example | 1 | 2 | 9 | 10 | 11 | 12 | 13 |
|---|---|---|---|---|---|---|---|
| PA-6 | 32.15 | 32.15 | 32.15 | 32.15 | 32.15 | 32.15 | 21.3 |
| Lot 3700 | 23.15 | 23.15 | 29.4 | 27.7 | 15.6 | 8 | 31 |
| AX 8660 | 8 | | | | 3.45 | 23.15 | 10.7 |
| XX 1275 | 1 | | | | 1 | 1 | 1.3 |
| $Mg(OH)_2$ | 30 | | | | 35 | 30 | 35 |
| $Sb_2O_3$ | 5 | | | | 5 | 5 | |
| Antiox 1 | 0.5 | | | | 0.5 | 0.5 | 0.5 |
| Antiox 2 | 0.2 | 1 | 0.85 | 1 | 0.2 | 0.2 | 0.2 |
| PROPERTIES | | | | | | | |
| EB (%) | 122 | 135 | 147 | 164 | 99 | 60 | 70 |
| TS (MPa) | 21.6 | 23.2 | 23.6 | 22.7 | 34.5 | 23.4 | 16.5 |
| FM (MPa) | 246 | 315 | 336 | 485 | 592 | 651 | 214 |
| LOI (%) | 28.6 | 28.4 | | | | | 27.8 |
| Creep (%) | 0.4 | | | | 0.31 | 0.39 | 1.2 |
| D.EB (%) | −15 | −10 | −22 | −15 | | | |
| D.TS (%) | −1 | −15 | −3.5 | −3.5 | | | |

TABLE 3

Compositions based on PA-6 and on crosslinked polymers with different contents of the flame-retardant fillers $Mg(OH)_2$ and $Sb_2O_3$

| Example | 1 | 2 | 14 | 15 | 16 | 17 | 18 | 19 | 20 | 21 |
|---|---|---|---|---|---|---|---|---|---|---|
| PA-6 | 32.15 | 32.15 | 49.65 | 42.15 | 37.15 | 27.15 | 22.15 | 29.65 | 27.15 | 23.65 |
| Lot 3700 | 23.15 | 23.15 | 35.75 | 30.3 | 26.75 | 19.55 | 15.95 | 21.35 | 19.55 | 17 |
| AX 8660 | 8 | 8 | 12.4 | 10.5 | 9.3 | 6.8 | 5.55 | 7.4 | 6.8 | 5.9 |
| XX 1275 | 1 | 1 | 1.5 | 1.35 | 1.1 | 0.8 | 0.65 | 0.9 | 0.8 | 0.75 |
| $Mg(OH)_2$ | 30 | 35 | 0 | 1.5 | 25 | 45 | 55 | 35 | 35 | 45 |
| $Sb_2O_3$ | 5 | | | | 5 | | | 5 | 10 | 7 |
| Antiox 1 | 0.5 | 0.5 | 0.5 | 0.5 | 0.5 | 0.5 | 0.5 | 0.5 | 0.5 | 0.5 |
| Antiox 2 | 0.2 | 0.2 | 0.2 | 0.2 | 0.2 | 0.2 | 0.2 | 0.2 | 0.2 | 0.2 |
| PROPERTIES | | | | | | | | | | |
| EB (%) | 122 | 135 | 179 | 167 | 129 | 45 | 6.6 | 52 | 28 | 18 |
| TS (MPa) | 21.6 | 23.2 | 25.3 | 23.7 | 22.7 | 19.6 | 15.5 | 19.3 | 18 | 17.2 |
| FM (MPa) | 246 | 315 | 270 | 229 | 244 | 362 | 418 | 334 | 388 | 398 |
| LOI (%) | 28.6 | 28.4 | 19.2 | | | | | | | |
| Creep (%) | 0.4 | | | | | | | | | |
| D.EB (%) | −15 | −10 | | | | | | | | |
| D.TX (%) | −1 | −15 | | | | | | | | |

TABLE 4

Compositions based on PA-6 and on crosslinked polymers with flame-retardant fillers of different natures

| Example | 1 | 2 | 22 | 23 | 24 | 25 |
|---|---|---|---|---|---|---|
| PA-6 | 32.15 | 32.15 | 56.86 | 28.3 | 32.15 | 29.65 |
| Lot 3700 | 23.15 | 23.15 | 20.45 | 40.35 | 23.15 | 21.35 |
| AX 8660 | 8 | 8 | 7.1 | 14 | 8 | 8 |
| XX 1275 | 1 | 1 | 0.88 | 1.65 | 1 | 1 |
| $Mg(OH)_2$ | 30 | 35 | | 15 | 30 | 30 |
| $Sb_2O_3$ | 5 | | 4 | | | |
| Adine 102 | | | | 10 | | |
| Mel. Cyan. | | | | | 13.25 | |
| Per | | | | | 1.75 | |
| Zn stannate | | | | | | 5 |
| Ceepree | | | | | | 40 |
| Antiox 1 | 0.5 | 0.5 | 0.5 | 0.5 | 0.5 | 0.5 |
| Antiox 2 | 0.2 | 0.2 | 0.2 | 0.2 | 0.2 | 0.2 |
| PROPERTIES | | | | | | |
| EB (%) | 122 | 135 | 167 | 65 | 134 | 125 |
| TS (MPa) | 21.6 | 23.2 | 34.7 | 10.4 | 23 | 19.3 |
| FM (MPa) | 246 | 315 | 1387 | 191 | 298 | 409 |
| LOI (%) | 28.6 | 28.4 | 29 | 25 | 28.7 | 27 |
| Creep (%) | 0.4 | | 0.5 | 2.4 | | |
| D.EB (%) | −15 | −10 | | | | |
| D.TS (%) | −1 | −15 | | | | |
| D.EBa (%) | 2 | −2 | | | 6.5 | |
| D.TSa (%) | −6.5 | −13 | | | −6.5 | |

TABLE 5

Compositions based on PA-6 and on crosslinked polymers with different reactants

| Example | 1 | 26 | 27 | 28 | 29 | 30 |
|---|---|---|---|---|---|---|
| PA-6 | 32.15 | 32.15 | 32.15 | 32.15 | 32.15 | 32.15 |
| Lot 3700 | 23.15 | | 25.95 | 24 | 24.1 | 24.05 |
| AX 8660 | 8 | 31 | | 8 | 8 | 8.02 |
| XX 1275 | 1 | | | | | |
| Tere acid | | | 1.15 | | | |
| Aral. DY0303 | | | | 5.7 | | |
| TMG | | | | | 0.05 | |
| Stearyl al. | | | | | 0.15 | |
| PTSA | | | | | | 0.08 |
| $Mg(OH)_2$ | 30 | 30 | 30 | 30 | 30 | 30 |
| $Sb_sO_3$ | 5 | 5 | 5 | 5 | 5 | 5 |
| Antiox 1 | 0.5 | 0.5 | 0.5 | 0.5 | 0.5 | 0.5 |
| Antiox 2 | 0.2 | 0.2 | 0.2 | 0.2 | 0.2 | 0.2 |
| PROPERTIES | | | | | | |
| EB (%) | 122 | 83 | 73 | 83 | 53 | 98 |
| TS (MPa) | 21.6 | 23.6 | 20.1 | 25.9 | 21.2 | 23.2 |
| FM (MPa) | 246 | 434 | 474 | 505 | 435 | 304 |
| LOI (%) | 28.6 | 29.4 | 28.6 | 29.3 | 29.9 | 28.6 |
| Creep (%) | 0.4 | 3.3 | 1 | 5 | 2.3 | 1.7 |

TABLE 6

Electrical properties of different compositions based on polyamide-6

| Example | 1 | 2 | 24 | 31 | 32 | 33 | 34 |
|---|---|---|---|---|---|---|---|
| PA-6 | 32.15 | 32.18 | 32.15 | | 8.04 | 16.075 | 24.11 |
| Plasticized PZ-6 | | | | 32.15 | 24.11 | 16.075 | 8.04 |
| Lot 3700 | 23.15 | 23.15 | 23.15 | 23.15 | 23.15 | 23.15 | 23.15 |
| AX 8660 | 8 | 8 | 8 | 8 | 8 | 8 | 8 |
| XX 1275 | 1 | 1 | 1 | 1 | 1 | 1 | 1 |
| Mg(OH)$_2$ | 30 | 35 | 30 | 30 | 30 | 30 | 30 |
| Sb$_2$O$_3$ | 5 | | | 5 | 5 | 5 | |
| Zn stannate | | | 5 | | | | |
| Antiox 1 | 0.5 | 0.5 | 0.5 | 0.5 | 0.5 | 0.5 | 0.5 |
| Antiox 2 | 0.2 | 0.2 | 0.2 | 0.2 | 0.2 | 0.2 | 0.2 |
| PROPERTIES | | | | | | | |
| EB (%) | 122 | 135 | 134 | 100 | 106 | 85 | 116 |
| TS (MPa) | 21.6 | 23.2 | 23 | 14 | 21.6 | 22.2 | 23.9 |
| FM (MPa) | 246 | 315 | 298 | 194 | 224 | 253 | 335 |
| LOI (%) | 28.6 | 28.4 | 28.7 | 28.6 | 28.8 | 29.3 | 28.6 |
| Tan δ 100 Hz | 0.086 | 0.076 | 0.094 | 0.12 | 0.0123 | 0.114 | 0.096 |
| Tan δ 1 MHz | 0.044 | 0.035 | 0.04 | 0.066 | 0.056 | 0.05 | 0.044 |
| ε 100 Hz | 4.6 | 3.9 | 5 | 7 | 6.2 | 5.7 | 5.2 |
| ε 1 MHz | 4.2 | 3.8 | 4.3 | 4.9 | 4.6 | 4.6 | 4.6 |
| SR ($10^{14}$ ohm) | 12 | 110 | 7.4 | 2.4 | 7.4 | 9.9 | 9.4 |
| TR ($10^{14}$ ohm · cm) | 6.7 | 20 | 6.3 | 0.53 | 0.55 | 1.4 | 5.6 |
| DS (kV/mm) | 15.6 | 15.1 | 15.7 | 15.7 | 14.2 | 13.7 | 14.5 |

TABLE 7

HCl and ASTM No. 2 oil behavior of different compositions containing PA-6, polyetheramide and different ratios of crosslinked polymers

| Example | 1 | 2 | 35 | 36 | 37 | 9 | 10 | 24 |
|---|---|---|---|---|---|---|---|---|
| PA-6 | 32.15 | 32.15 | 28.94 | 24.1 | 28.94 | 32.15 | 32.15 | 32.15 |
| PB 6333 | | | 3.21 | 8.05 | | | | |
| PB 2533 | | | | | 3.21 | | | |
| Lot 3700 | 23.15 | 23.15 | 23.15 | 23.15 | 23.15 | 29.4 | 27.7 | 23.15 |
| AX 8660 | 8 | 8 | 8 | 8 | 8 | 1.75 | 9.3 | 8 |
| XX 1275 | 1 | 1 | 1 | 1 | 1 | 1 | 1 | 1 |
| Mg(OH)$_2$ | 30 | 35 | 30 | 30 | 30 | 35 | 35 | 30 |
| Sb$_2$O$_3$ | 5 | 5 | 5 | 5 | | | | |
| Zn stannate | | | | | | | | 5 |
| Antiox 1 | 0.5 | 0.5 | 0.5 | 0.5 | 0.5 | 0.5 | 0.5 | 0.5 |
| Antiox 2 | 0.2 | 0.2 | 0.2 | 0.2 | 0.2 | 0.2 | 0.2 | 0.2 |
| PROPERTIES | | | | | | | | |
| EB (%) | 135 | 135 | 94 | 102 | 105 | 147 | 164 | 134 |
| TS (MPa) | 24.2 | 23.2 | 22 | 18.4 | 20.4 | 23.6 | 22.7 | 23 |
| FM (MPa) | 292 | 315 | 221 | 156 | 179 | 336 | 485 | 298 |
| D.EB (%) | −15 | −10 | −22 | −24 | −22 | −15 | | |
| D.TS (%) | −1 | −15 | A | −14 | −9 | −3.5 | −3.5 | |
| D.EBa (%) | 2 | −2 | 16 | 4 | 12 | 1.5 | 9 | 6.5 |
| D.TSa (%) | 4.5 | −13 | −5 | −3 | −7 | −9.5 | −4.5 | −6.5 |
| D.EBb (%) | −1.5 | 23 | 8.5 | I | 6 | −1.5 | 3.5 | |
| D.TSb (%) | −9 | −1 | −7 | 8 | −10 | −9.5 | −7 | |

I claim:

1. An electrical cable having a covering comprising at least one layer of thermoplastic composition comprising:
   (A) a polyamide matrix;
   (B) a dispersed phase of polyolefin formed from an at least partially crosslinking reaction of an ethylene molecule or an ethylene polymer (B1) carrying at least one functional group derived from acids and derivatives thereof, or polyamines with an ethylene molecule or an ethylene polymer (B2) carrying at least one epoxide functional group, and
   (C) a flame-retardant agent distributed between phases (A) and (B), wherein the ratio of the content of polyamide (A) to that of the dispersed phase (B) is between 0.25 to 3, and the flexural modulus of the composition is less than 1,000 MPa.

2. The electrical cable according to claim 1, wherein the dispersed phase (B) is in the form of nodules.

3. The electrical cable according to claim 1, wherein the dispersed phase (B) is formed from a chemical reaction of (B1) with (B1).

4. The electrical cable according to claim 1, wherein the dispersed phase (B) is formed from a chemical reaction of (B2) with (B2).

5. The electrical cable according to claim 1, wherein the dispersed phase (B) is formed from a chemical reaction of an ethylene polymer (B1) carrying at least one functional group derived from carboxylic acids with an ethylene polymer (B2) carrying at least one epoxide functional group in the presence of an activator (B3) containing nitrogen or a tertiary amine functional group.

6. The electrical cable according to claim 1, wherein the flexural modulus of the composition is between 100 and 500 MPa.

7. The electrical cable according to claim 6, wherein the flexural modulus of the composition is between 150 and 450 MPa.

8. The electrical cable according to claim 1, wherein the ratio of the content of polyamide (A) to that of the dispersed phase (B) is between 0.67 and 1.5.

9. The electrical cable according to claim 5, wherein the ratio of the content of the activator (B3) to the sum of the contents of the reactants (B1) and (B2) is between 0 and 0.5.

10. The electrical cable according to claim 9, wherein the ratio of the content of the activator (B3) to the sum of the contents of the reactants (B1) and (B2) is between 0 and 0.1.

11. The electrical cable according to claim 1, wherein the composition is prepared by a process comprising steps of premixing the polyamide (A), the components of the dispersed phase (B) and at least a part of the flame-retardant agents (C) into a mixture; introducing the mixture into a first region of an extruder; and introducing the remainder of the flame-retardant agents into a subsequent region of the extruder.

* * * * *